United States Patent [19]

Glumac

[11] 4,113,118
[45] Sep. 12, 1978

[54] LOADING ARRANGEMENT

[75] Inventor: Nick P. Glumac, Chesterton, Ind.

[73] Assignee: Toter-Tee, Inc., Chesterton, Ind.

[21] Appl. No.: 708,400

[22] Filed: Jul. 26, 1976

[51] Int. Cl.² .............................................. B65G 1/16
[52] U.S. Cl. .............................. 214/10.5 R; 108/53.5;
206/386; 206/821; 105/366 R
[58] Field of Search .............. 214/10.5 R; 105/366 R,
105/366 C, 366 A, 366 D, 373, 463, 464, 465,
366 B; 206/386, 821, 499; 108/53.1, 53.5, 53.3

[56] References Cited

U.S. PATENT DOCUMENTS

| 1,663,375 | 3/1928 | Kirchner | 105/366 C |
| 2,776,775 | 1/1957 | Averhill | 108/53.5 X |
| 3,508,764 | 4/1970 | Dobson et al. | 105/366 D |
| 3,844,600 | 12/1974 | Jay | 214/10.5 R X |

FOREIGN PATENT DOCUMENTS 427,647   6/1967   Switzerland .......................... 108/53 B Primary Examiner—Frank E. Werner

[57] ABSTRACT

Means for mounting and securing a plurality of load bearing members to a loading platform including the stacking and locking of said members in various configurations thereupon.

3 Claims, 7 Drawing Figures

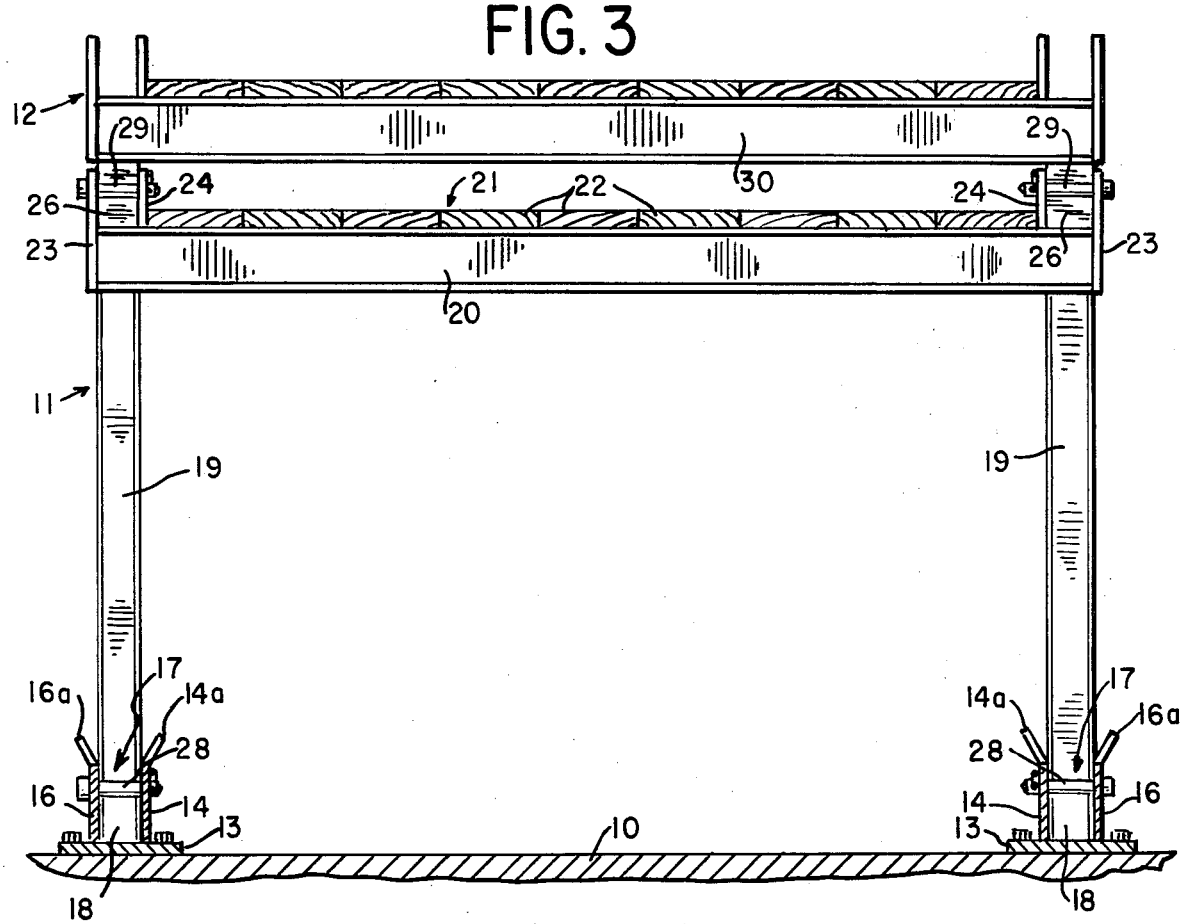
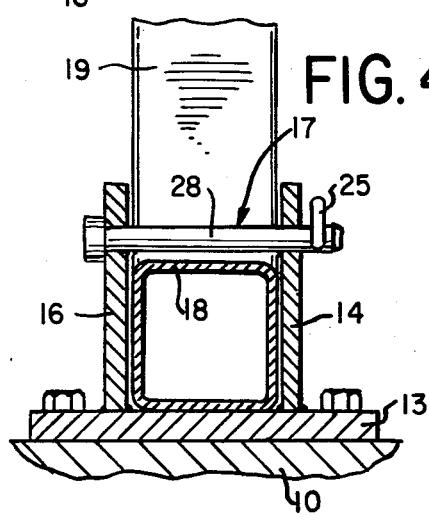
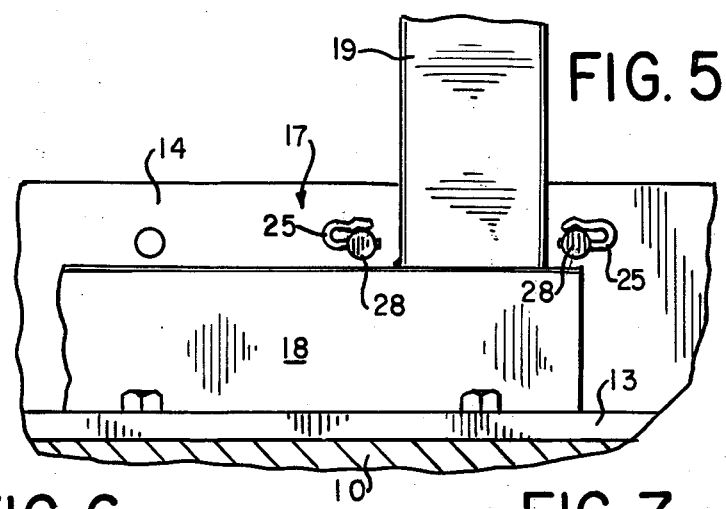
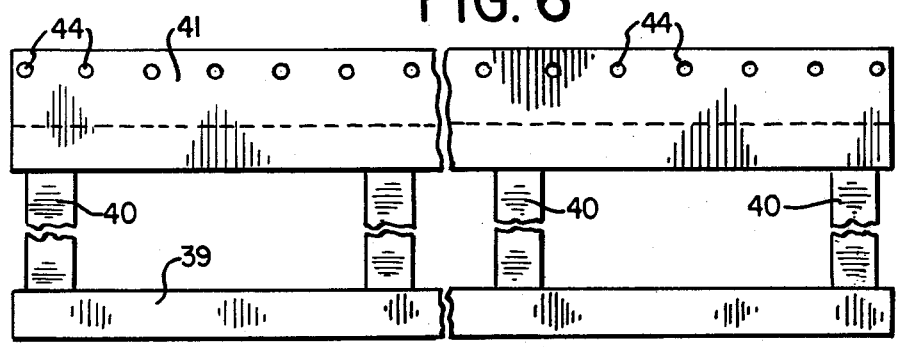
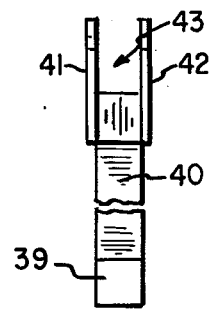

LOADING ARRANGEMENT

BACKGROUND OF THE INVENTION

Modern transportation of materials, particularly the transportation of heavy loads, ideally requires the integration of rail, truck and sea systems most adapted to the transport of heavy loads. Some progress has been achieved by the use of container modules which are readily loaded upon and unloaded from rail or truck to ship or barge; however, there is a vast area of transport involving the shipment of very heavy material products or equipment which does not lend itself to containerized techniques. Generally speaking, such heavy loads have heretofore required individual loading upon flat cars, truck beds or barge loading areas with consequent great expenditure of manpower and the use of heavy lifting equipment in situ wherever such loads require loading or unloading.

In U.S. Pat. No. 3,737,061, a novel system for transporting load bearing pallets upon a liftable truck bed of unique design has been disclosed. Such pallets are capable of receiving a heavy-weight load, can be lifted for land transport, then dropped at a receiving depot. It is the object of the present invention to disclose a system for stacking and transporting load bearing pallets of different configurations and means for securing such pallets upon any load bearing surface, e.g. a railroad flat bed, barge or ship loading deck, or a truck flat bed. Since the means for securing the pallets is uniform and is independent of a particular mode of transport, be it land or sea, the pallets are readily shifted with their cargo from one transportation mode to the other.

SUMMARY OF THE INVENTION

In accordance with the present invention, a loading and stacking arrangement for load receiving pallets is provided which is particularly useful in standardizing and integrating systems in several transportation modes, i.e. barge or ship, truck or rail. The stacking arrangement includes in combination a pallet having a plurality of vertical legs adjacently and longitudinally arranged to form side sections thereof, a beam extending longitudinally beneath each said leg securely fastened thereto, a plurality of transverse cross-beams connected to the upper ends of said legs, and a first pair of lower channel members which are mounted to the loading platform in any of the above said modes of transportation. A second pair of channel members are attached to the upper ends of said side sections, said upper channel members being adapted to receive in a stacked arrangement, the base beams of vertically oriented pallets of similar construction to that just described.

The lower end of each of the pallet legs are securely locked into the respective channel members by means of transverse bolts having means at both ends thereto to prevent withdrawal after being placed into position. The upper ends of the channel members may be suitably flanged to facilitate insertion of the base beams into said channel members, and furthermore, spacers may be employed also equipped with channel members along the upper sides thereof in order to elevate or extend any pallet member to add additional height.

BRIEF DESCRIPTION OF THE DRAWING

FIG. 1 is a side elevation of various pallet loading arrangements in accordance with the present invention;

FIGS. 3 and 4 are respectively sectional views taken in the direction of arrows 3—3 and 4—4 respectively of FIG. 1;

FIG. 5 is a side view of the pallet securing means shown in FIG. 4;

FIG. 6 is a detail of a spacer which may be employed in connection with the pallet configuration of FIGS. 1-5; and FIG. 7 is an end view of the spacer of FIG. 6.

DESCRIPTION OF PREFERRED EMBODIMENTS

Figure 2:
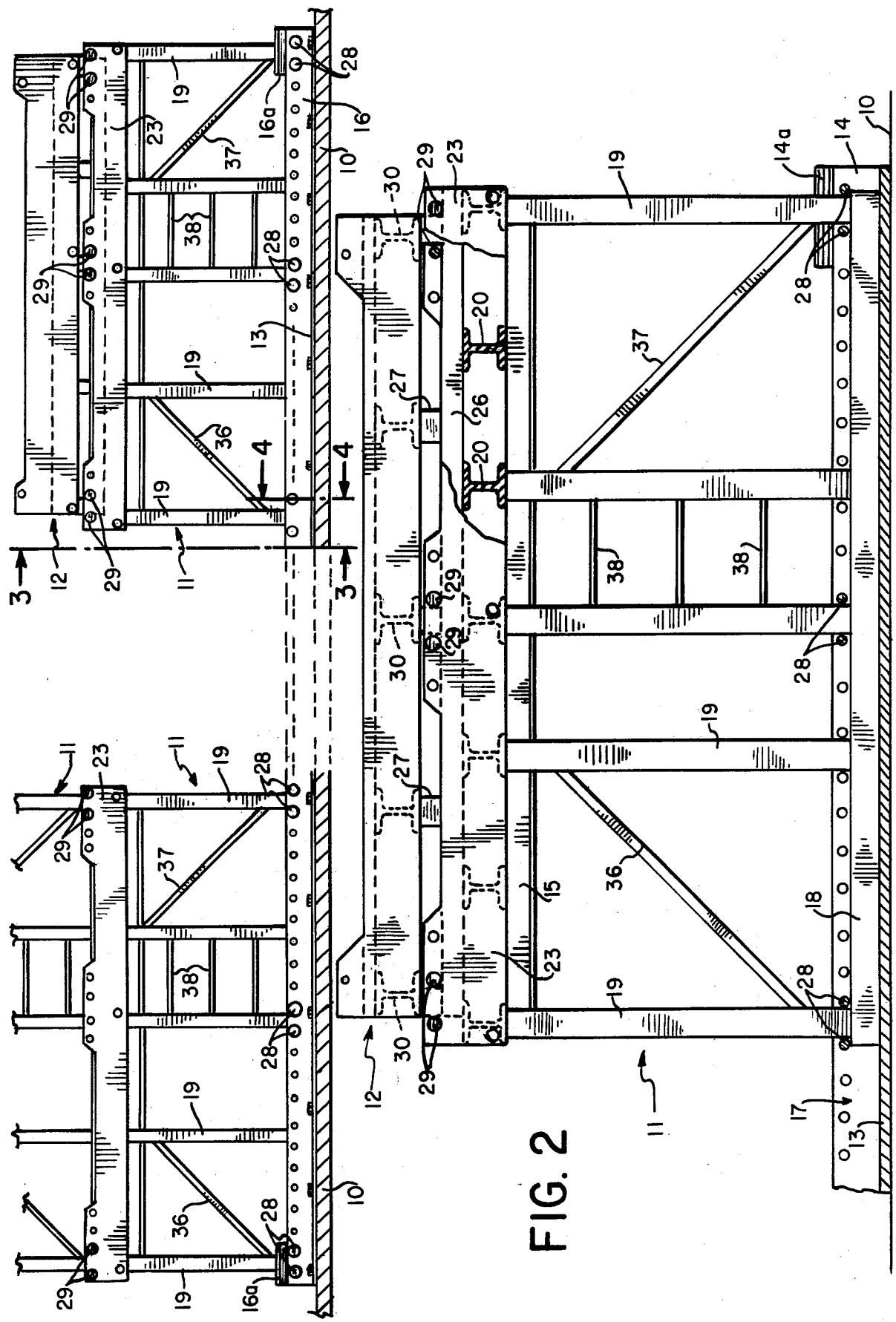
FIG. 2 is an enlarged view partially broken away of one of the stack pallet arrangements shown in FIG. 1.

Referring now to the drawing, FIG. 1 illustrates a loading platform 10, which may be any loading surface, for example, the flat bed of a truck or railroad car, or the deck of a barge or ship. Loaded upon platform 10 for transport to an appropriate destination are a series of load receiving pallets, those of the same or similar construction having been designated by reference numeral 11 and a second pallet of different configuration, having been designated by reference numeral 12. These pallets have been illustrated in a stacked and unloaded condition, since it will be apparent from the written description how various loaded configurations may be achieved. It will be seen that at the left of FIG. 1, two pallets 11 have been stacked vertically one above the other, while at the right of the figure, a pallet 12 is stacked upon one of the pallets 11. It shall be sufficient to say that the only difference between pallets 11 and 12, functionally speaking, is that pallets 11 are intended to receive a load having a substantial height, whereas pallet 12 is adapted to receive a load of low profile or reduced height.

FIG. 3 is an end view of the stacking arrangement shown in FIG. 2 of two pallets 11 and 12, one above the other. It will be seen in this figure that securely bolted to the platform 10 are longitudinal plates 13 to which have been welded lower, vertical channel forming members 14 and 16, each of which has upper flanged ends 14(a) and 16(a) respectively. The members 14 and 16 define therebetween channels 17 which are sized to fit and receive snuggly the lower extremities of a pallet 11.

Referring to FIG. 4, each pallet 11 have longitudinal base (box) beams 18 at its base from which extend a plurality of legs 19, also of rectangular cross section. The horizontal base beams 18 and vertical legs 19 are securely welded together. Proceeding upwardly, again with respect to FIG. 3, a plurality of I-beams 20 extend horizontally and transversely above each of the vertical legs 19 and are securely welded thereto to form an extremely rigid load bearing and receiving structure. Secondary horizontal beams 15 underlie those beams 20 which are not directly supported by a leg 19. A load bearing platform 21 comprised of planking 22 is arranged upon the horizontally transverse beams 20. Plates 23 and 24 are securely welded to the beams 20 forming an upper channel therebetween adapted to receive the lower end of the pallet 12, which consists of horizontal box beams 26 and short or stub legs 27.

Referring to FIG. 4, it will be seen that a series of bolts 28 extend through members 14 and 16 securely lock the base of each pallet to the load bearing surface 10. Spring clips 25 prevent withdrawal of bolts 28. Similarly, bolts 29 pass through plate members 23 and 24 at the upper end of pallet 11 to securely lock the base leg portions of pallet 12. Pallet 12 is similar in all respects to pallet 11 except that its base leg portions 26 and 27 are much shorter vertically than the combination of base beams 18 and legs 19 of pallet 11. As seen in FIG. 3, each pallet 12 comprises a series of horizontal and transversely extending I-beams 30 welded to the upper end of short legs 27, said beams 30 supporting a planked load bearing surface 31. At the outer extremity of the beams 30 and securely welded thereto are vertical plates 32, and welded to the upper surface of beams 30 are vertical legs 33, which define a channel 34 for the reception of yet another pallet according to the present invention, each in stacked relation thereto.

Referring again to FIGS. 1 and 2, it will be observed that diagonal reinforcing members 36 and 37 are provided between certain adjacent legs 19 of pallet 11. Horizontal rungs 38 are welded at appropriate vertical intervals to adjacent legs 19 to form a ladder.

FIGS. 6 and 7 illustrate a form of spacer which permits raising the height of either pallet 11 or 12 if so desired. The spacer comprises horizontal base box beam 39 to which are welded a plurality of legs 40 having any desired height. The upper ends of legs 40 are welded to inner and outer plate members 41, 42 which define a channel 43 suitable for reception of say the base beam 18 or 26 of either pallet 11 or 12. Plates 41 and 42 are provided with a series of spaced, matched openings 44 with a reception of bolt similar to bolts 28 shown in FIG. 4.

In accordance with the present invention, it will be thus seen that a very simple yet effective arrangement has been achieved for securely mounting load bearing pallets of differing height configurations upon a loading platform. The disclosed arrangement is especially useful because it standardizes such mounting means and readily permits the movement of the disclosed pallets between sea and land modes of transportation, including in the latter rail and truck transportation. Furthermore, the channel members which receive the base beams of each pallet and which are in turn secured to the loading platform, are identical, functionally speaking, to the channel members attached to the upper ends of each pallet; consequently, the pallets themselves may be stacked one upon the other for transport, either empty or in their fully loaded condition.

It will be understood that the foregoing description has been of preferred embodiments and is therefore merely representative. In order to appreciate the scope of the invention, reference should be made to the appended claims.

I claim:

1. A loading, stacking arrangement for load receiving pallets and the like and for mounting same securely to a loading platform including in combination, a pallet having a plurality of vertical legs adjacently and longitudinally arranged comprising side sections thereof, a base beam extending longitudinally beneath each said leg securely fastened thereto, a plurality of transverse cross beams connected to the upper ends of said legs, a first pair of lower channel members having a height in excess of the height of said base beams for closely encompassing and receiving the base beams beneath each side section, means for securing said lower channel members to said loading platform, a second pair of upper vertically oriented channel members attached to the upper ends of said side sections and to said cross beams, said upper pair of channel members being adapted to closely encompass and receive the base beams of a second pallet of similar configuration to the first mentioned pallet and adapted to rest upon said cross beams, said upper pair of channel members having a height in excess of the height of said base beams, and locking means for locking the respective base beams of said first mentioned and second pallets into respectively the lower and upper channel members receiving said respective base beams.

2. The loading and stacking arrangement of claim 1 wherein said lower and upper channel members extend generally coextensively in length with the base beams which they receive and a series of spaced horizontal bolts arranged to be received through said channel members above said base beams to lock said base beams in position after the latter have been received in said channel members.

3. The loading and locking arrangement of claim 1 wherein two spacers are used to elevate the side sections of a pallet from said lower channel members, each said spacer comprising a base beam received in said lower channel member, legs extending to a predetermined height above said base beam, and an intermediate channel member attached to the upper ends of said legs for receiving the base beam of one of said pallets to extend the height thereof.

* * * * *